(12) United States Patent
Pilipetskii et al.

(10) Patent No.: US 6,584,262 B1
(45) Date of Patent: Jun. 24, 2003

(54) METHOD AND APPARATUS FOR THE OPTIMIZATION OF DISPERSION MAP USING SLOPE-COMPENSATING OPTICAL FIBERS

(75) Inventors: Alexei N. Pilipetskii, Colts Neck, NJ (US); Neal Bergano, Lincroft, NJ (US); M. Imran Hayee, Woodstock, MD (US); Bo Pedersen, Annapolis, MD (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 51 days.

(21) Appl. No.: 09/708,238

(22) Filed: Nov. 6, 2000

(51) Int. Cl.[7] .................................................. G02B 6/02
(52) U.S. Cl. .......................... 385/123; 385/122; 385/31; 385/27
(58) Field of Search ............................... 385/24, 31, 38, 385/27, 122–128; 359/159

(56) References Cited

U.S. PATENT DOCUMENTS

| | | | |
|---|---|---|---|
| 5,191,631 A | 3/1993 | Rosenberg | 385/123 |
| 6,084,993 A | 7/2000 | Mukasa | 385/24 |
| 6,188,823 B1 * | 2/2001 | Ma | 385/123 |
| 6,263,138 B1 * | 7/2001 | Sillard et al. | 385/123 |
| 6,324,317 B1 * | 11/2001 | Tanaka et al. | 359/159 |

FOREIGN PATENT DOCUMENTS

| | | | |
|---|---|---|---|
| EP | 0570723 | 11/1993 | G02B/6/16 |
| EP | 1035671 | 9/2000 | H04B/10/18 |
| FR | 2788394 | 7/2000 | H04B/10/12 |
| WO | 0019255 | 4/2000 | G02B/6/22 |

* cited by examiner

Primary Examiner—Ellen E. Kim

(57) ABSTRACT

An apparatus comprises operationally coupled optical fiber segments that define an optical sublink. The optical sublink has link spans including a first link span and a second link span. The first link span has an average dispersion with a magnitude greater than zero. The second link span has an average dispersion with a magnitude greater than zero. The optical sublink has an end-to-end dispersion less than an end-to-end dispersion tolerance limit.

18 Claims, 10 Drawing Sheets

METHOD AND APPARATUS FOR THE OPTIMIZATION OF DISPERSION MAP USING SLOPE-COMPENSATING OPTICAL FIBERS

BACKGROUND

The present invention generally relates to optical telecommunications. More specifically, the present invention relates to the optimization of optical fiber dispersion maps using slope-compensating optical fibers.

Light propagating within an optical fiber undergoes chromatic dispersion which causes the light to be delayed within the optical fiber. The specific amount of dispersion that light undergoes varies depending upon the wavelength of the light. The manner in which an optical fiber causes light to undergo chromatic dispersion is typically characterized by two parameters: (1) the dispersion at one specific wavelength, and (2) the dispersion slope, which indicates the extent to which dispersion varies as a function of light wavelength.

The dispersion slope of an optical fiber can significantly limit the usable bandwidth for a wavelength-division multiplex (WDM) system, which uses multiple information channels each having their own wavelength of light. Each information channel can accumulate its own amount of dispersion over the transmission link length. For example, in a WDM system having 10 Gb/s data-rate information channels, the information channels can accumulate a large amount of dispersion (e.g., more than ±3000 ps/nm) over long transmission distances, such as transoceanic transmission distances (e.g., 7000–10,000 km). When the accumulated dispersion is too large, the system performance is degraded due to intersymbol interference which, in turn, limits the system bandwidth.

Certain known dispersion maps compensate for the accumulated dispersion. In one such example, optical fiber segments having dispersions with opposite signs, can be alternatingly connected to define an optical link. In such a known dispersion map, the end-to-end path average dispersion remains low and fiber nonlinearities are suppressed.

A drawback associated with this type of dispersion map, however, is that the end-to-end path average dispersion varies significantly from wavelength to wavelength over long transmission distances due to the non-matching dispersion slopes of the two alternating optical fibers that define the overall optical link. This variation in the end-to-end path average dispersion (as a function of wavelength) limits the bandwidth of such a transmission system. Said another way, the bandwidth of a transmission system can only be expanded so far until the wavelength-based end-to-end path average dispersion limits the allowable bandwidth. Thus, a need exists to reduce the end-to-end path average dispersion below a tolerance threshold over a wide range of wavelengths. This need is particularly desirable with the prevalence of high-channel-count WDM systems.

SUMMARY OF THE INVENTION

An apparatus comprises operationally coupled optical fiber segments that define an optical sublink. The optical sublink has link spans including a first link span and a second link span. The first link span has an average dispersion with a magnitude greater than zero. The second link span has an average dispersion with a magnitude greater than zero. The optical sublink has an end-to-end dispersion less than an end-to-end dispersion tolerance limit.

DETAILED DESCRIPTION

An apparatus comprises operationally coupled optical fiber segments that define an optical sublink. The optical sublink has link spans including a first link span and a second link span. The first link span has an average dispersion with a magnitude greater than zero. The second link span has an average dispersion with a magnitude greater than zero. The optical sublink has an end-to-end dispersion less than an end-to-end dispersion tolerance limit.

The term "optical fiber segments" is used herein to include portions of optical fibers where each optical fiber portion has its own optical and/or physical characteristics, such as dispersion, dispersion slope, effective cross-sectional area and/or length. The optical fiber segments can be operationally coupled to define a longer "optical sublink", and multiple optical sublinks can be coupled together to define an optical link. For example, two types of optical fiber segments can be alternatingly coupled to define an optical sublink. An optical sublink can include optical devices (e.g., optical amplifiers) or optical components (e.g., couplers) between two optical fiber segments. An optical sublink can be, for example, a portion of an optical communication system between the transmitter and the receiver.

The term "link spans" is used herein to include subsets of the optical link. For example, link spans can be portions of the optical link between two optical repeaters.

Figure 1:
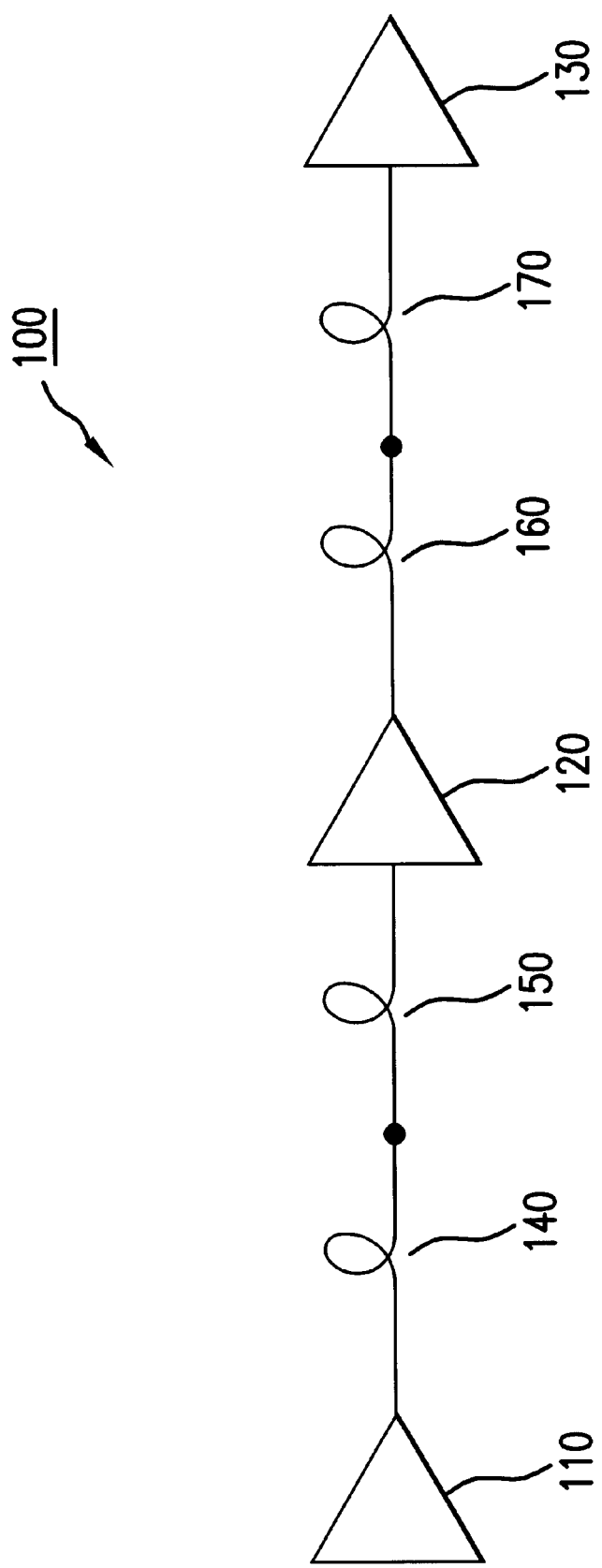
FIG. 1 illustrates a portion of an optical link configured of optical fibers having similar magnitude, but opposite sign dispersion and opposite sign dispersion slope, in accordance with a one-level dispersion management (OLDM) scheme.

Optical fibers having opposite sign dispersions and opposite sign dispersion slopes are becoming commercially available. These optical fibers having the appropriate lengths can be alternatingly coupled to form link spans of an optical sublink. FIG. 1 illustrates a portion of an optical link (i.e., an optical sublink) configured of optical fibers having opposite sign dispersion and opposite sign dispersion slope, in accordance with a one-level dispersion management (OLDM) scheme. In this particular example, the lengths of the optical fibers are similar (although in other optical links, the optical fiber can have different lengths but similar relative dispersion slopes, as discussed below). As shown in FIG. 1, fiber 100 includes amplifiers 110, 120, 130, and fiber segments 140, 150, 160 and 170. Fiber segments 140 and 160 can be of the same first type having a dispersion, $D_1$, and having a length, $L_1$. Fiber segments 150 and 170 can be of the same second type having a dispersion, $D_2$, and having a length, $L_2$. In this example, a link span can be defined as fiber segments having the first and second fiber types (for example, fiber segments 140 and 150).

The first fiber type can have, for example, a dispersion, $D_1$, of 16.9 ps/nm-km; a dispersion slope, $D_1'$, of 0.06 ps/nm$^2$-km; and an effective area of 75 $\mu$m$^2$. Such a type of optical fiber is commercially available as "single-mode fiber (SMF)". The SMF fiber is produced by several fiber manufacturers including Corning and Lucent. The relative dispersion slope of the first fiber type is the ratio of the first-fiber-type dispersion slope and dispersion, $D_1'/D_1$.

The second fiber type can have, for example, a dispersion, $D_2$, of −17.0 ps/nm-km; a dispersion slope, $D_2'$, of −0.06 ps/nm$^2$-km; and an effective area of 35 $\mu$m . Such a type of optical fiber has been designated commercially as "1x inverse-dispersion fiber (1x-IDF)". Another example of an optical fiber having a negative dispersion and a negative dispersion slope is the optical fiber designated commercially as "2x-IDF" which has a dispersion of −34.0 ps/nm-km and a dispersion slope of −0.12 ps/nm$^2$-km and an effective area of about 34 $\mu$m$^2$. Both the 1x-IDF and the 2x-IDF fibers are produced by Lucent.

The relative dispersion slope of the second fiber type is the ratio of the second-fiber-type dispersion slope and dispersion, $D_2'/D_2$. By appropriately selecting the dispersion and dispersion slope of the first fiber type and of the second fiber type, the relative dispersion slope of the first fiber type and of the second fiber type can be selected to be approximately equal.

For such a configuration, the average dispersion, $D_{avg}$, can be determined by the following:

$$D_{avg} = \frac{D_1 L_1 + D_2 L_2}{L_1 + L_2}$$

The average dispersion slope, $D'_{avg}$, can be determined by the following:

$$D'_{avg} = \frac{D'_1 L_1 + D'_2 L_2}{L_1 + L_2}$$

Figure 2:
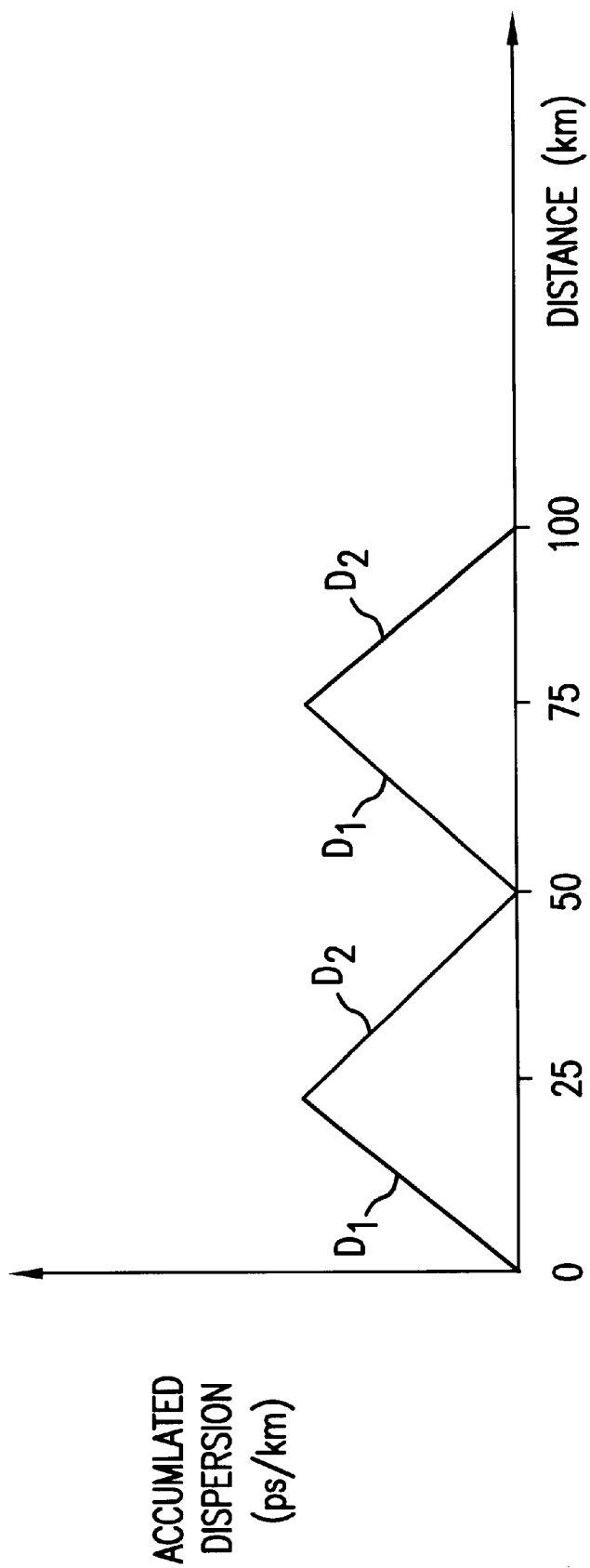
FIG. 2 illustrates accumulated dispersion as a function of transmission distance for the portion of the optical link shown in FIG. 1.

FIG. 2 illustrates accumulated dispersion as a function of transmission distance for the optical sublink shown in FIG. 1. As the FIG. 2 illustrates, for a given link span, the dispersion along one fiber segment accumulates to a particular point and then the dispersion along the next fiber segment reduces the accumulated dispersion back to about zero. Because the dispersion slopes of the two fiber segments have similar magnitudes but are opposite signed, the accumulated dispersions for all wavelengths are all reduced to about zero at the end of the link span.

Figure 3:
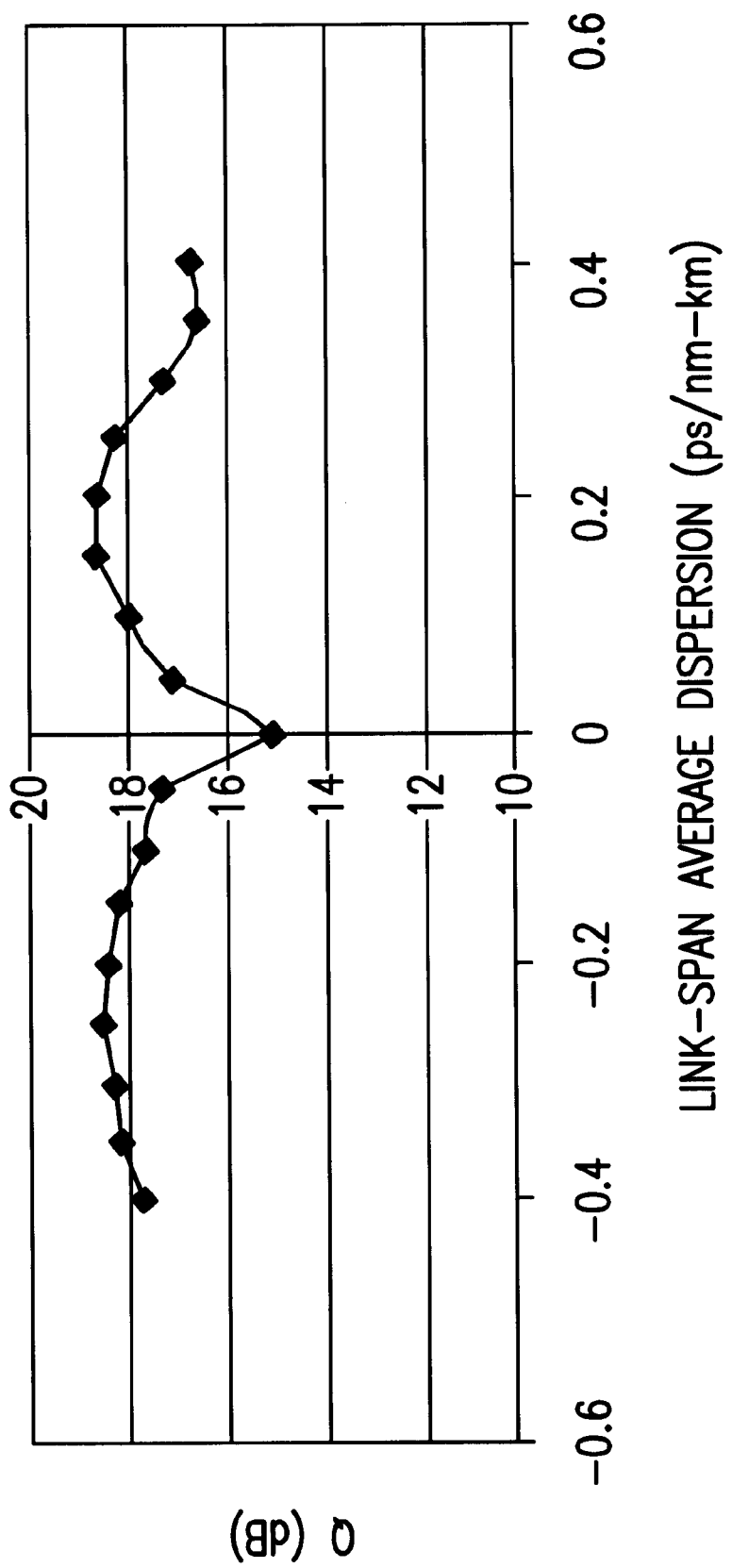
FIG. 3 illustrates the Q-factor in dB as a function of the link-span average dispersion in ps/nm-km, for the portion of the optical link shown in FIG. 1.

It has been recognized, however, that such a configuration has a less than optimal performance. FIG. 3 illustrates the Q-factor (in dB) as a function of the link-span average dispersion (in ps/nm-km), for the portion of the optical link shown in FIG. 1. The Q-factor (dB) is a measure of quality of data transmission. For example, Q=18.06 dB corresponds to a bit error rate (BER)=6×10$^{-16}$, and Q=15.1 corresponds to BER=6×10$^{-9}$.

As FIG. 3 illustrates, when the magnitude of the link-span average dispersion is around zero, the Q-factor (and thus the system performance) is worse than for non-zero link-span average dispersions due to cross-phase modulation. As the magnitude of the link-span average dispersion is increased from zero, the Q-factor increases to a maximum before decreasing again due to intersymbol interference from too much accumulated dispersion. Consequently, the inventors have recognized that dispersion maps using dispersion-slope-compensating optical fibers should be designed so that the magnitude of the average link-span dispersion is greater than zero (for example, more than 0.1 ps/nm-km for the example illustrated in FIG. 3) while the overall optical sublink has an accumulated dispersion less than a dispersion tolerance limit. The magnitude of the average dispersion accumulated over a link span should be greater than zero so that the cross-phase modulation is reduced to an acceptable level.

Figure 4:
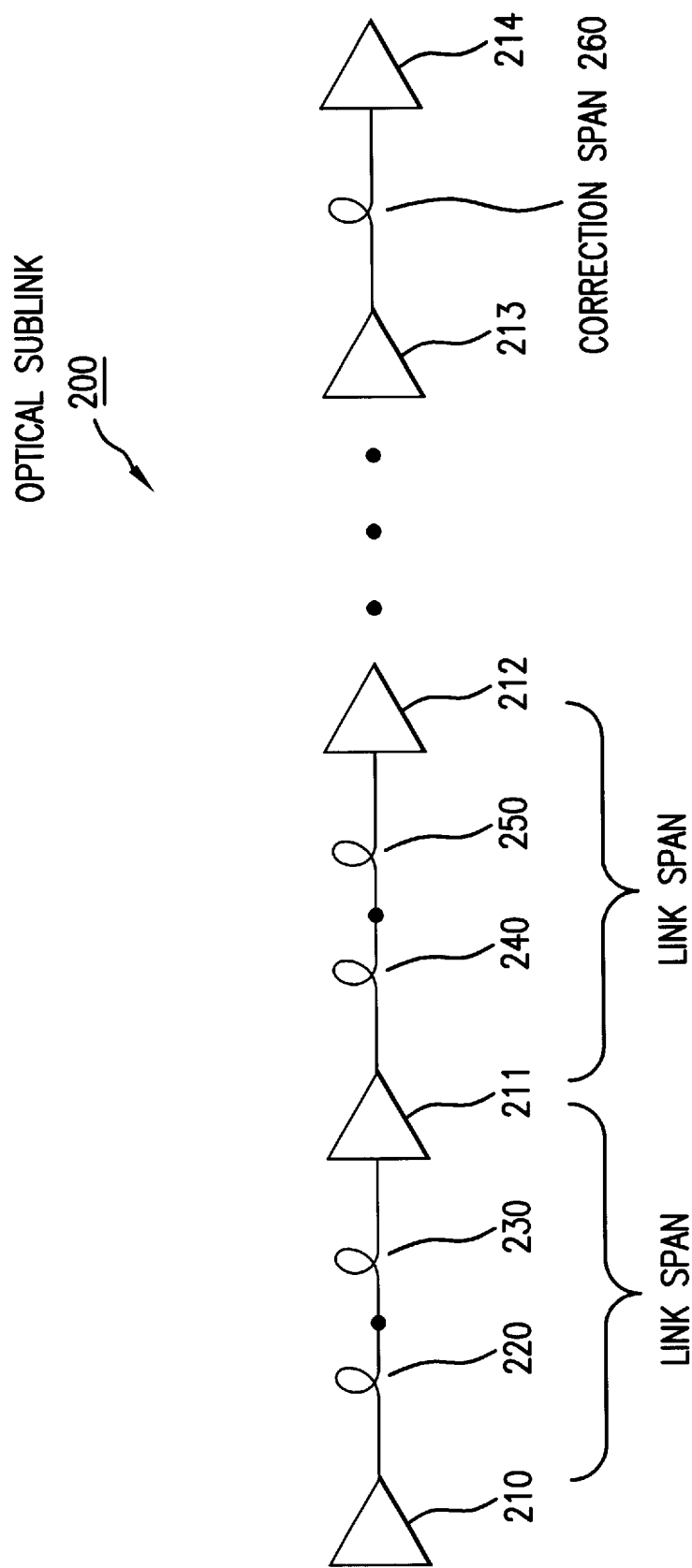
FIG. 4 illustrates a portion of an optical sublink having an end-sublink compensation (ESLC), according to an embodiment of the present invention.

FIG. 4 illustrates a portion of an optical sublink having an end-sublink compensation (ESLC), according to an embodiment of the present invention. Optical sublink 200 includes optical amplifiers 210, 211, 212, 213 and 214. Optical sublink 200 also includes fiber segments 220, 230, 240, 250 and 260. Optical sublink 200 is configured such that the following components are connected in series: amplifier 210, fiber segment 220, fiber segment 230, amplifier 211, fiber segment 240, fiber segment 250 and amplifier 212. Amplifier 213 is connected to fiber segment 260 which in turn is connected to amplifier 214. As discussed below, fiber segment 260 acts to correct dispersion associated with the other link spans, and as such, is also referred to herein as a "correction span". Note that for optical sublink 200, amplifier 212 and amplifier 213 are coupled together through a series of link spans including fiber segments and amplifiers not shown in FIG. 4.

Fiber segments 220 and 240 can be of a first type of optical fiber (such as, for example, SMF fiber discussed above). Fiber segments 230 and 250 can be a second type of optical fiber (such as, for example, IDF fiber discussed above). Fiber segment (correction span) 260 can be either the first fiber type or the second fiber type as necessary to create the appropriate correction for the amount of dispersion accumulated before amplifier 213.

Figure 5:
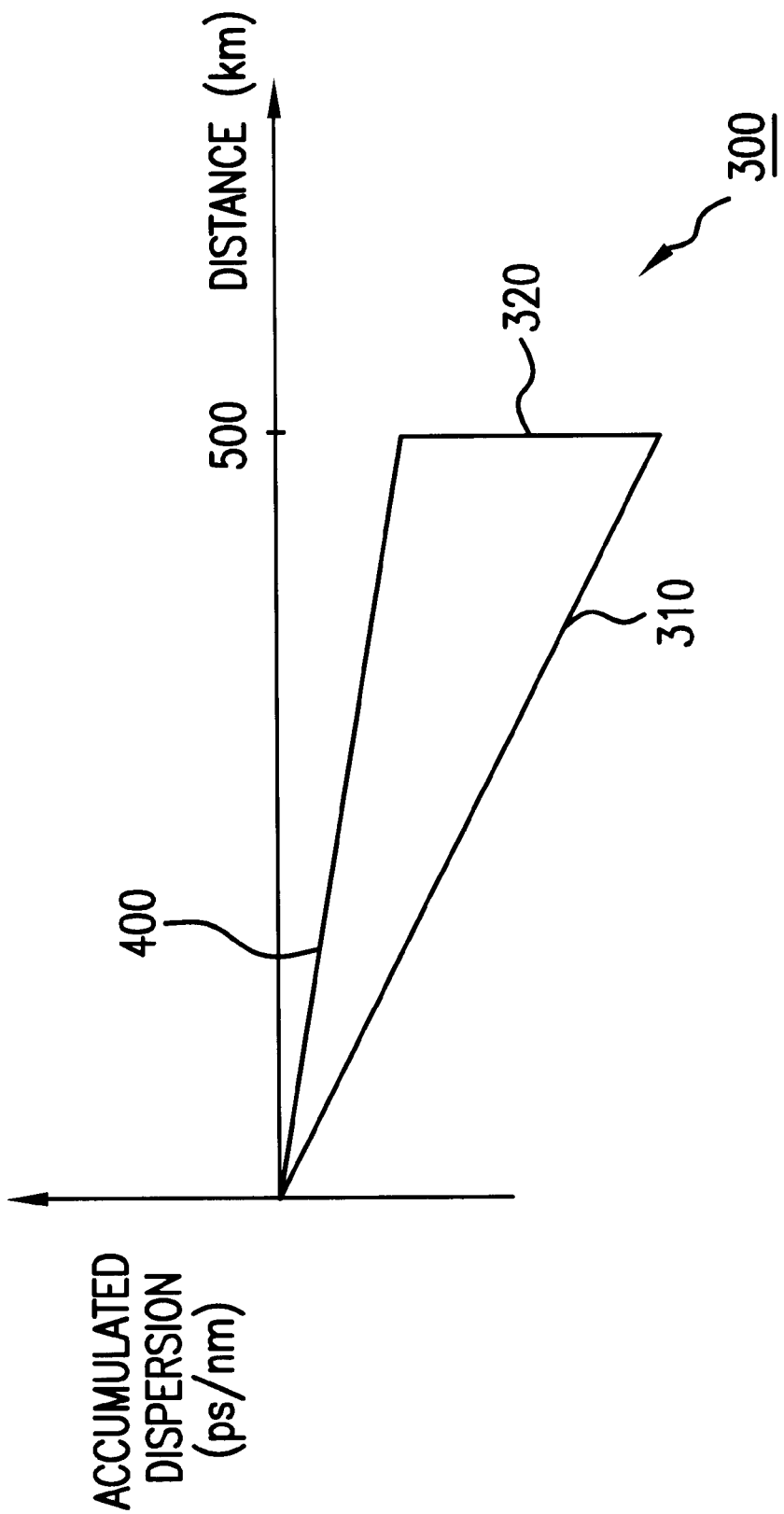
FIG. 5 illustrates a dispersion map associated with the optical sublink shown in FIG. 4 according to an embodiment of the present invention.

FIG. 5 illustrates a dispersion map associated with the optical sublink shown in FIG. 4 according to an embodiment of the present invention. Dispersion map 300 includes dispersion map portions 310 and 320. Dispersion map portion 310 corresponds to the accumulated dispersion for the link spans between amplifier 210 and amplifier 213. Dispersion map portion 320 corresponds to the accumulated dispersion for optical fiber segment (correction span) 260 between optical amplifiers 213 and 214. Line 400 corresponds to the accumulated dispersion for a one-level dispersion management (OLDM), such as for example, the optical sublink 100 shown in FIG. 1.

Note that dispersion map 300 can be referred to as a two-level dispersion map because it has two portions 310 and 320 with different characteristics. This example of a two-level dispersion map differs from line 400 which corresponds, for example, to the accumulated dispersion for a one-level dispersion management (OLDM). The accumulated dispersion associated with line 400 equals the dispersion of the sublink, $D_{sublink}$, multiplied by the length of the sublink considered, $L_{sublink}$.

As FIG. 5 illustrates, the dispersion map 300 is configured such that the accumulated dispersion increases with propagation distance an amount greater than the accumulated dispersion associated with line 400. In other words, the accumulated dispersion for the various link spans between amplifier 210 and amplifier 213 is substantially greater than zero. Said another way, the accumulated dispersion associated with dispersion map portion 310 is substantially greater than zero as well as substantially greater than the accumulated dispersion associated with OLDM (e.g., shown as line 400 on FIG. 5). More specifically, the accumulated dispersion associated with dispersion map portion 310 equals the dispersion of a link span, $D_{link\ span}$, multiplied by the length of a link span, $L_{link\ span}$, multiplied by the number of link spans associated with the optical sublink, $N_{spans}$.

Fiber segment (correction span) 260 acts to correct the dispersion accumulated by the link spans between amplifier 210 and 213. As shown by the dispersion map 300, this correction is associated with dispersion map portion 320. In other words, the dispersion that accumulates for the various link spans between amplifier 210 and 213 (as represented by portion 310) is corrected by the last fiber segment (correction span) 260 (as represented by portion 320 of the dispersion map).

The accumulated dispersion associated with dispersion map portion 320 approximately equals the dispersion of the correction span, $D_{correction\ span}$, multiplied by the length of the correction span, $L_{correction\ span}$. The accumulated dispersion associated with dispersion map portion 210 determines the extent to which the average dispersion for the optical sublink is offset from zero dispersion. Thus, the accumulated dispersion for the sublink (e.g., sublink 200) is approximately equal to:

$$(D_{link\ span})(L_{linkspan})(N_{spans}) - (D_{correction\ span})(L_{correction\ span}).$$

Of course, this expression for the accumulated dispersion for the sublink (e.g., sublink 200) assumes that the length and dispersion of the link spans are approximately the same. In a case where the lengths and dispersions of the link spans differ, the accumulated dispersion for the sublink (e.g., sublink 200) equals the sum of the products of each link-span dispersion and length, minus the product of the correction-span dispersion and the correction-span length.

Figure 6:
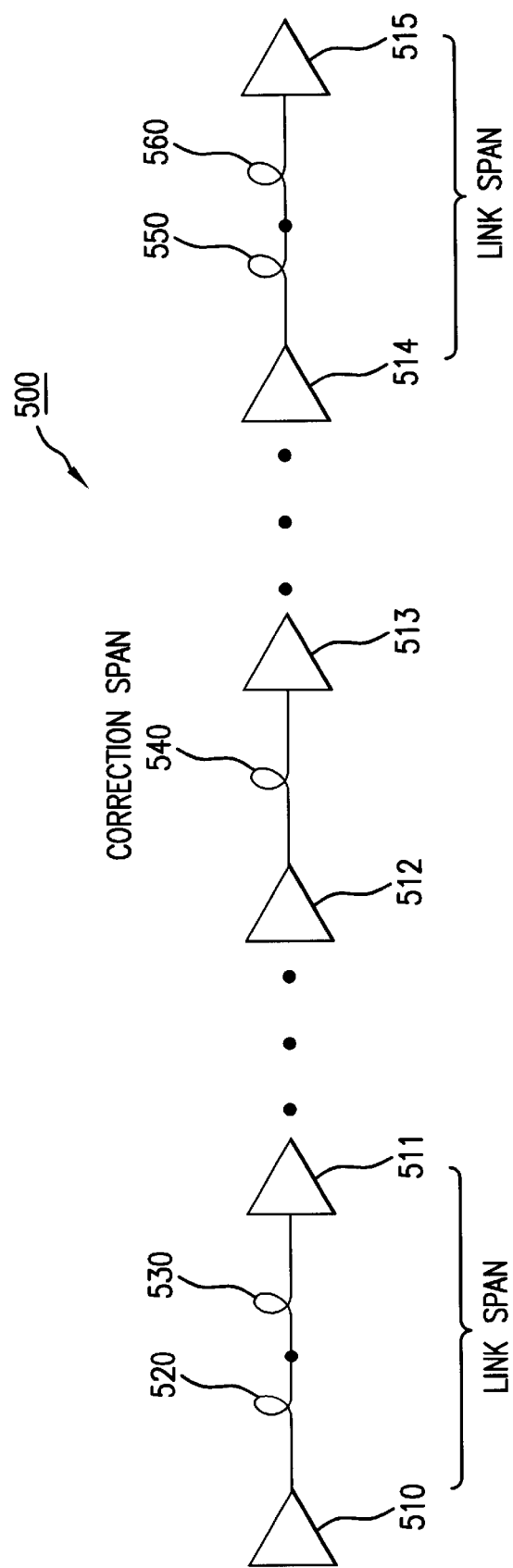
FIG. 6 illustrates an optical sublink having mid sublink compensation (MSLC), according to an embodiment of the present invention.

FIG. 6 illustrates an optical sublink having mid sublink compensation (MSLC), according to an embodiment of the present invention. Optical sublink 500 includes optical amplifier 510, 511, 512, 513, 514 and 515. Optical sublink 500 also includes fiber segments 520, 530, 540, 550 and 560. Optical sublink 500 is connected in the following order. Optical sublink 500 is configured such that the amplifier 510, fiber segment 520, fiber segment 530 and amplifier 511 are connected in series; amplifier 512, fiber segment 540 and amplifier 513 are connected in series; and amplifier 514, fiber segment 550, fiber segment 560 and amplifier 515 are connected in series. As discussed below, fiber segment 540 acts to correct dispersion associated with the other link spans, and as such, is also referred to herein as a "correction span". Note that the optical sublink 500, amplifier 511 and amplifier 512 can be connected through a series of link spans (or connected directly); similarly, amplifier 513 and amplifier 514 can be connected through another series of link spans (or connected directly).

Fiber segments 520 and 550 can be of a first type of optical fiber (such as, for example, SMF fiber discussed above). Fiber segments 530 and 560 can be of a second type of optical fiber (such as, for example, IDF fiber discussed above). Fiber segment (correction span) 540 can be either the first fiber segment or the second fiber type as necessary to create the appropriate correction of the amount of dispersion accumulated through the remaining fiber segments (e.g., fiber segments 520, 530, 550 and 560).

Figure 7:
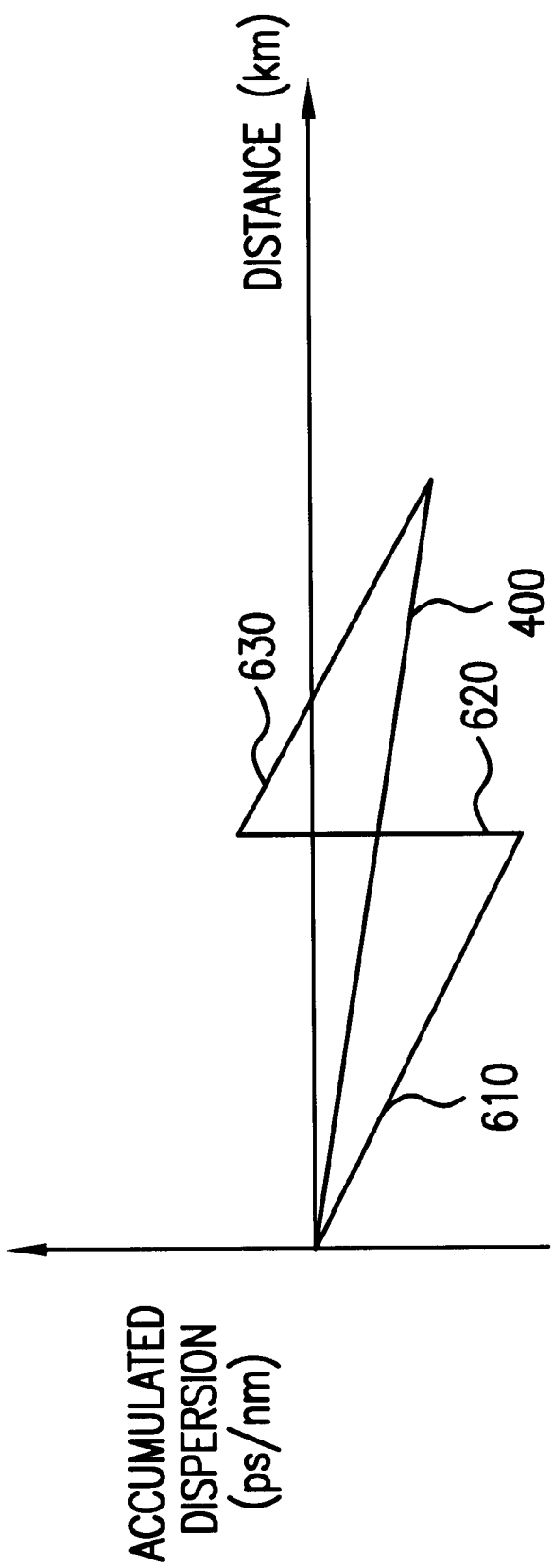
FIG. 7 illustrates a dispersion map associated with the optical sublink shown in FIG. 6, according to an embodiment of the present invention.

FIG. 7 illustrates a dispersion map associated with the optical sublink shown in FIG. 6, according to another embodiment of the present invention. The dispersion map shown in FIG. 7 includes three portions 610, 620 and 630. Dispersion map portion 610 is associated with the portion of optical sublink 500 between amplifier 510 and amplifier 512. Dispersion map portion 620 is associated with the portion of optical sublink 500 between amplifier 512 and 513 (i.e., fiber segment 540). Dispersion map portion 630 associated with the portion of optical sublink 500 between amplifier 513 and amplifier 515. Again, line 400 corresponds to an OLDM dispersion map such as, for example, the optical sublink shown in FIG. 1.

As the dispersion map in FIG. 7 shows a fiber segment (e.g., fiber segment 540) can be inserted in the middle of the optical sublink thereby providing a correction approximately half way along the propagation distance of the optical sublink.

Figure 8:
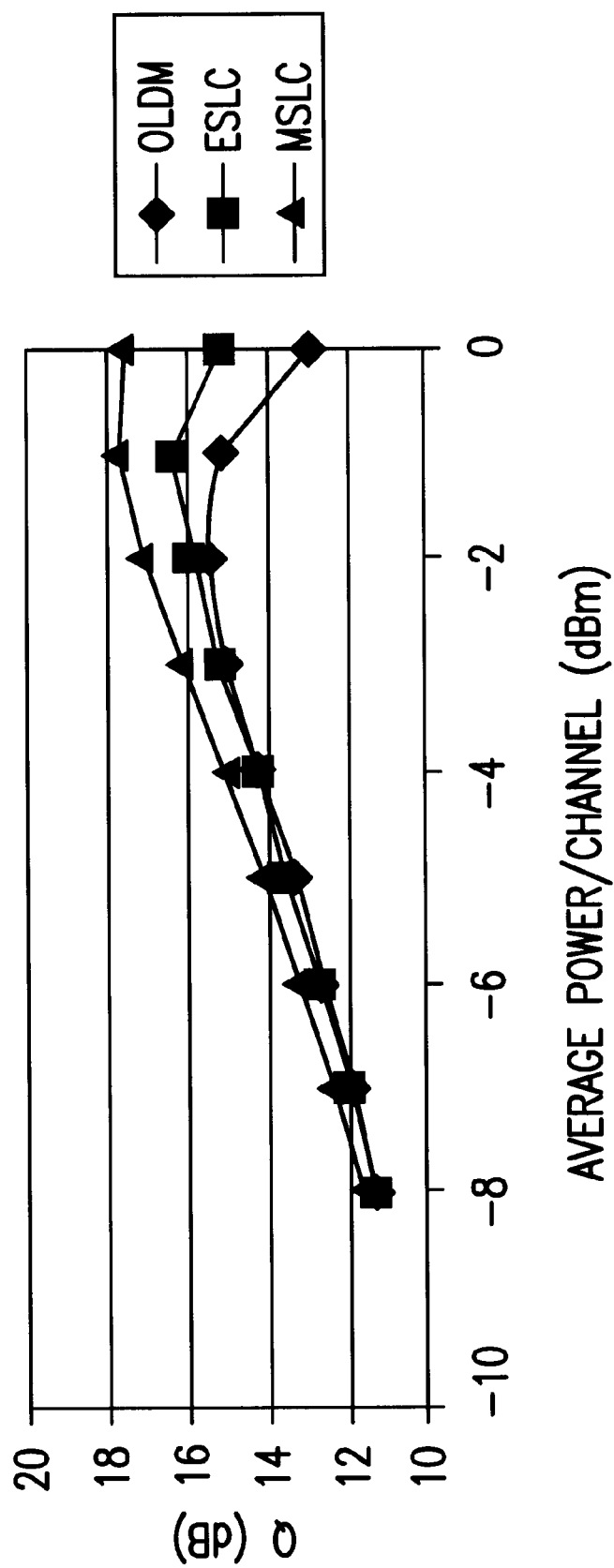
FIG. 8 is a graph showing the Q-factor system performance versus the average power-per-channel for a one level dispersion map and the two types of two level dispersion maps, ESLC and MSLC.

FIG. 8 is a graph showing system performance Q-factor (dB) versus the average power-per-channel for an OLDM dispersion map and the two types of two-level dispersion maps, ESLC and MSLC. As shown in FIG. 8, the two types of two level dispersion management perform better than the one level dispersion management in the presence of nonlinearities, more specifically note that the Q factor increases for the two types of two-level dispersion management over the one-level dispersion management as the average power-per-channel is increased. FIG. 8 also illustrates that the system performance for MSLC is better than the system performance for ESLC because the maximum accumulated dispersion for each link span in the optical sublink is almost half for the MSLC as compared to the ESLC; consequently the intersymbol interference effect is lower for the MSLC.

The results shown in FIG. 8 are an example based on a optical link with a distance of 10,000 kilometers (e.g., having 20 optical sublinks each with a 500 km length), with the data rate of 12.3 Gb/s for each channel, with a channel spacing of 0.6 nm. The results shown in FIG. 8 are based on a value of the average dispersion for given link span of approximately −2.5 ps/nm-km.

Figure 9:
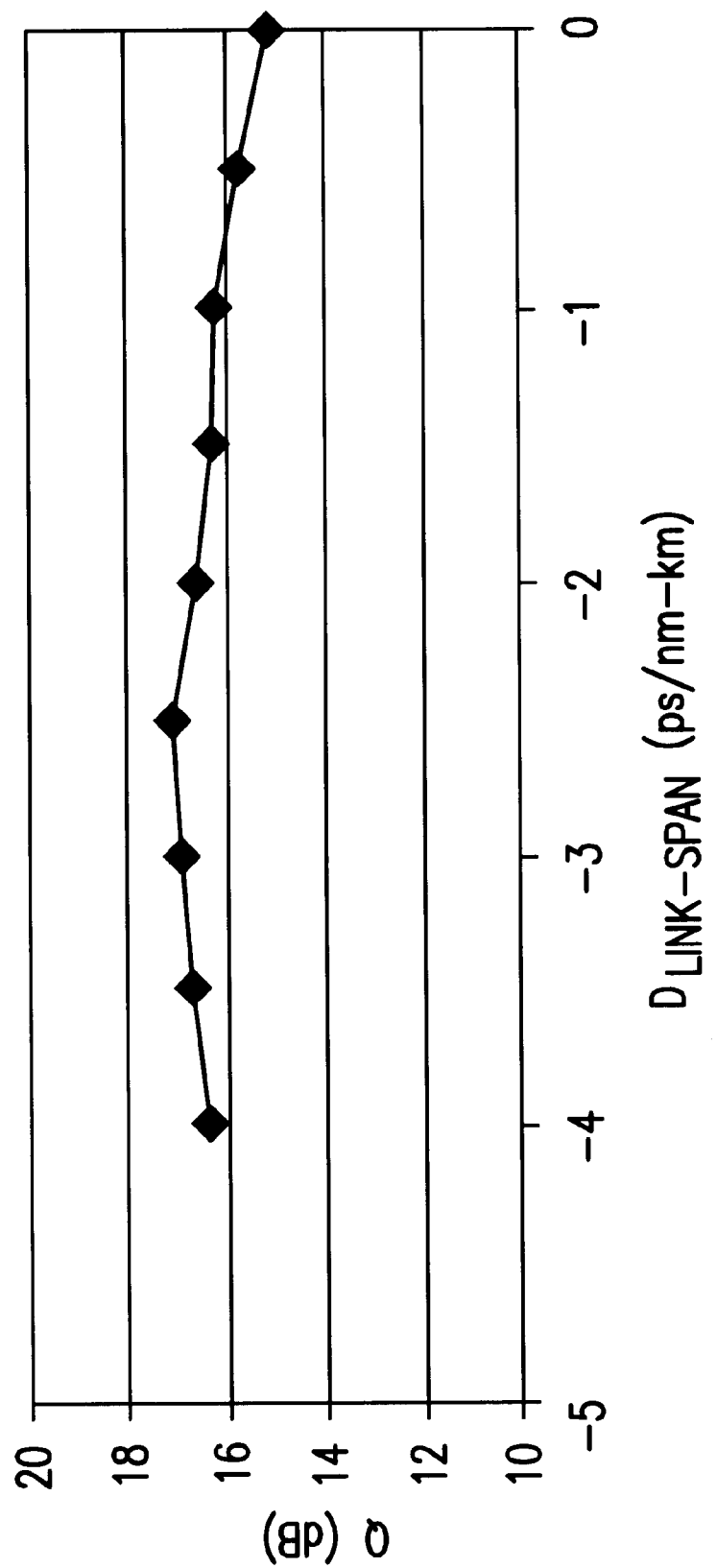
FIG. 9 illustrates the Q-factor system performance as a function of the average link-span dispersion for a MSLC dispersion map.

FIG. 9 illustrates the Q-factor system performance as a function of the average dispersion for a given link span based on the results shown in FIG. 8. The results shown in FIG. 9 are for a MSLC dispersion map. For this particular configuration, FIG. 9 illustrates that the optimum value of the average dispersion for a link span is approximately −2.5 ps/nm-km. More specifically, there is a wide range of values for the average dispersion for given link span (i.e., −2 to −4 ps/nm-km) which provide similar system performance. This wide range of values for the average dispersion for a given link span is advantageous because in a practical long distance optical link having many link spans it is very difficult to control the average dispersion for given link span to obtain very specific value. Consequently, because a large range of values for the average dispersion for given link span provides very similar optimal system performance, a corresponding optical system will be relatively robust and will perform well based on variations of the average dispersion for a given link span.

Figure 10:
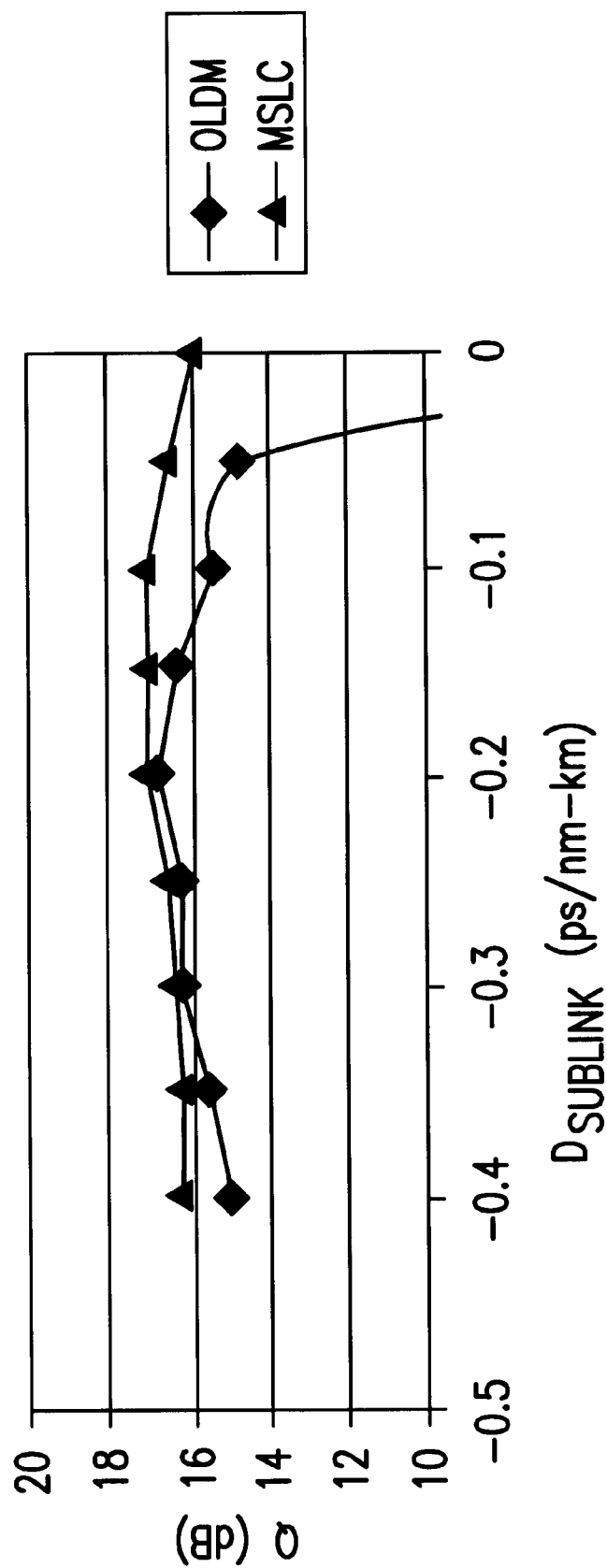
FIG. 10 shows a graph of the Q-factor system performance as a function of the link-span average dispersion.

FIG. 10 shows a graph of the Q-factor system performance as a function of the average dispersion for an optical sublink based on the results in FIGS. 8 and 9. Again, FIG. 10 is based on a MSLC dispersion map where the average dispersion is −0.1 ps/nm-km and the average power-per-channel is −2 dBm.

Note that for the OLDM, a Q-factor value of 16 dB or higher can be obtained for a wide range of end-to-end average dispersion values (e.g., −0.13 to −0.33 ps/nm-km). Similar types of Q-factor values can be obtained for the MSLC for a greater range of average dispersion values (e.g., 0 to −0.4 ps/nm-km); this range of acceptable average dispersion values for the MSLC is about twice the range of that for a OLDM. In addition, the inventors expect that a similar range of Q-factor values will be obtained for a positive dispersion region for the MSLC, which effectively again doubles the available range of average dispersion. In other words, because the average dispersion for the MSLC does not dip near zero, the range of average dispersion for which acceptable Q-factor values can be obtained the inventors expect will essentially be between −0.4 to 0.4 ps/nm-km. Consequently, the MSLC scheme is almost four times more tolerant to residual dispersion slope from that of the OLDM scheme. Therefore about four times more wavelength can be used effectively by an MSLC scheme as compared to the OLDM scheme.

Note also that for the OLDM scheme, the similar range of Q-factor values will be obtained in the positive dispersion region; thus, and a substantial dip in the Q-factor system performance occurs around a zero value of the average dispersion. Thus, the effective range of average dispersion end to end for the OLDM scheme is considerably less than MSLC scheme due to the unacceptable drop in Q-factor system performance around a zero average dispersion end to end.

It should, of course, be understood that while the present invention has been described in reference to particular configurations, other configurations should be apparent to those of ordinary skill in the art. For example, although the optical fiber types discussed as examples above related to particular commercial slope-compensating optical fibers, other types of slope-compensating optical fibers are possible.

What is claimed:

1. An apparatus, comprising:
a plurality of operationally coupled optical fiber segments defining an optical sublink, the optical sublink having a plurality of link spans including at least a first link span and a second link span,
the first link span having an average dispersion with a magnitude greater than zero,
the second link span having an average dispersion with a magnitude greater than zero,
the optical sublink having an end-to-end dispersion less than an end-to-end dispersion tolerance limit.

2. The apparatus of claim 1, wherein:
the dispersion tolerance limit being less than the magnitude of the average dispersion of the first link span and less than the magnitude of the average dispersion of the second link span.

3. The apparatus of claim 1, wherein:
said plurality of optical fiber segments are constructed from at least a first optical fiber type and a second optical fiber type, the first optical fiber type has a positive dispersion, $D_1$, and a positive dispersion slope, $D'_1$, and
the second optical fiber type has a negative dispersion, $D_2$, and a negative dispersion slope, $D'_2$, the second optical fiber type having a relative dispersion slope, $D'_2/D_2$ approximately equal to a relative dispersion slope, $D'_1/D_1$, of the first optical fiber type.

4. The apparatus of claim 3, wherein:
the plurality of link spans further includes at least a first subset of link spans and a correction link span, the first subset of link spans includes the first link span and the second link span,
each link span from the first subset of link spans has a first optical fiber type and a second optical fiber type, the correction link span has the first optical fiber type,
the first subset of link spans being disposed before the correction link span with respect to a direction of light propagation.

5. The apparatus of claim 3, wherein:
the plurality of link spans further includes a first subset of link spans, a second subset of link spans and a correction link span, the first subset of link spans including the first link span, the second subset of link spans including the second link span,
each link span from the first subset of link spans has a first optical fiber type and a second optical fiber type, each link span from the second subset of link spans has the first optical fiber type and the second optical fiber type, the correction link span has the first optical fiber type,
the correction link span is disposed between the first subset of link spans and the second subset of link spans.

6. The apparatus of claim 3, wherein:
the plurality of link spans further includes a first subset of link spans and a second subset of link spans, the first subset of link spans including the first link span, the second subset of link spans including the second link span,
each link span from the first subset of link spans has a first optical fiber type and a second optical fiber type, each link span from the second subset of link spans has the first optical fiber type and the second optical fiber type,
each link span from the first subset of link spans having an increasingly cumulative dispersion in a direction of light propagation,
each link span from the second subset of link spans having an decreasingly cumulative dispersion in the direction of light propagation.

7. The apparatus of claim 1, wherein:
the optical sublink further includes at least first optical amplifier, a second optical amplifier and a third optical amplifier,
the first link span is between the first optical amplifier and the second optical amplifier,
the second link span is between the second optical amplifier and the third optical amplifier.

8. An apparatus, comprising:
a plurality of operationally coupled optical fiber segments defining an optical sublink, the optical sublink having a plurality of link spans including at least a first subset of link spans and a correction link span, the optical sublink having an end-to-end dispersion and an end-to-end length,
each link span from the first subset of link spans having an average dispersion and a link span length, the correction link span having an average dispersion and a correction link span length, the end-to-end dispersion of the optical sublink multiplied by the end-to-end length of the optical sublink being substantially equal to the product sum of the average dispersion and the link span length for each link span from the plurality of link spans minus the average dispersion of the correction link span multiplied by the length of the correction link span.

9. The apparatus of claim 8, wherein:

the link average dispersion of each link span from the plurality of link spans being less than an onset of intersymbol interference.

10. The apparatus of claim 8, wherein:

said plurality of optical fiber segments are constructed from at least a first optical fiber type and a second optical fiber type, the first optical fiber type has a positive dispersion, $D_1$, and a positive dispersion slope, $D'_1$, and the second optical fiber type has a negative dispersion, $D_2$, and a negative dispersion slope, $D'_2$, the second optical fiber type having a relative dispersion slope, $D'_2/D_2$ approximately equal to a relative dispersion slope, $D'_1/D_1$, of the first optical fiber type.

11. The apparatus of claim 10, wherein:

each link span from the plurality of link spans has a first optical fiber type and a second optical fiber type, the correction link span has the first optical fiber type, the plurality of link spans is disposed before the correction link span with respect to a direction of light propagation.

12. The apparatus of claim 10, wherein:

the plurality of link spans further including a second subset of link spans, each link span from the first subset of link spans has a first optical fiber type and a second optical fiber type, each link span from the second subset of link spans has the first optical fiber type and the second optical fiber type, the correction link span has the first optical fiber type, the correction link span is disposed between the first subset of link spans and the second subset of link span.

13. An apparatus, comprising:

a plurality of operationally coupled optical fiber segments defining an optical link, the optical link having a plurality of link spans each having its own local path average dispersion, the plurality of link spans defining a two-level dispersion map, said two-level dispersion map including a first portion and a second portion, the first portion of the two-level dispersion map having a local path average dispersion greater than zero, and the second portion of the two-level dispersion map having a local path average dispersion greater than zero, an end-to-end dispersion associated with the first portion of the two-level dispersion map and associated with the second portion of the two-level dispersion map is less than an end-to-end dispersion tolerance limit.

14. The apparatus of claim 13, wherein:

the optical link has a cumulative dispersion slope substantially equal to zero.

15. The apparatus of claim 13, wherein:

the first portion of the two-level dispersion map disposed before the second portion of the two-level dispersion map with respect to a direction of light propagation.

16. The apparatus of claim 13, wherein:

the two-level dispersion map including a first portion, a second portion and a third portion, the first portion of the two-level dispersion map having an average dispersion greater than zero, and the second portion of the two-level dispersion map having an average dispersion greater than zero, the third portion of the third-level dispersion map having an average dispersion greater than zero, an end-to-end dispersion associated with the first portion, the second portion and the third portion of the two-level dispersion map is less than an end-to-end dispersion tolerance limit.

17. The apparatus of claim 16, wherein:

the first portion of the two-level dispersion map is ordered first with respect to a direction of light propagation, the second portion of the two-level dispersion map is ordered second with respect to the direction of light propagation, and the third portion of the two-level dispersion map is ordered third with respect to the direction of light propagation.

18. The apparatus of claim 13, wherein:

the two-level dispersion map including a first portion and a second portion, the first portion of the two-level dispersion map having an increasingly cumulative dispersion in the direction of light propagation, and the first portion of the two-level dispersion map having a decreasingly cumulative dispersion in the direction of light propagation.

* * * * *